United States Patent
Ito et al.

(10) Patent No.: US 11,503,939 B2
(45) Date of Patent: Nov. 22, 2022

(54) INDUCTION HEATING COOKER

(71) Applicant: Mitsubishi Electric Corporation, Tokyo (JP)

(72) Inventors: Yuichiro Ito, Tokyo (JP); Kyoko Ishihara, Tokyo (JP); Toshihiro Saito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 327 days.

(21) Appl. No.: 16/768,428

(22) PCT Filed: Dec. 7, 2017

(86) PCT No.: PCT/JP2017/043931
§ 371 (c)(1),
(2) Date: May 29, 2020

(87) PCT Pub. No.: WO2019/111367
PCT Pub. Date: Jun. 13, 2019

(65) Prior Publication Data
US 2020/0383512 A1    Dec. 10, 2020

(51) Int. Cl.
*A47J 27/00* (2006.01)
*A47J 36/32* (2006.01)
(Continued)

(52) U.S. Cl.
CPC .......... *A47J 27/004* (2013.01); *A47J 27/002* (2013.01); *A47J 36/32* (2013.01); *H05B 6/1272* (2013.01); *H05B 6/36* (2013.01)

(58) Field of Classification Search
CPC ................................ H05B 6/1272; H05B 6/44
See application file for complete search history.

(56) References Cited

U.S. PATENT DOCUMENTS

2010/0065552 A1* 3/2010 Matsen ............... B29C 35/0805
                                                    219/671
2015/0245417 A1* 8/2015 Fattorini ................ H05B 6/065
                                                    219/662
(Continued)

FOREIGN PATENT DOCUMENTS

DE    102009018134 A1 *  9/2010  ............. H05B 6/065
EP         699014 A1  *  2/1996  ............. H05B 6/065
(Continued)

OTHER PUBLICATIONS

Extended European Search Report dated Nov. 9, 2020 issued in corresponding EP patent application No. 17933897.5.
(Continued)

*Primary Examiner* — John J Norton
(74) *Attorney, Agent, or Firm* — Posz Law Group, PLC

(57) ABSTRACT

An induction heating cooker includes a housing, an inner pot including a bottom part that includes a first area and a second area, and an inner pot storage part disposed in the housing. The inner pot storage stores the inner pot in a manner that the inner pot can be set or removed. Also, a first heating coil is below the inner pot storage part, arranged in a position facing the first area of the inner pot, that heats the inner pot by induction. Also, a second heating coil is below the inner pot storage part, arranged in a position facing the second area of the inner pot, that heats the inner pot by induction. A driving unit in the housing supplies high frequency currents to the first heating coil and the second heating coil, and a controller controls the driving unit.

7 Claims, 9 Drawing Sheets

(51) Int. Cl.
*H05B 6/36* (2006.01)
*H05B 6/12* (2006.01)

(56) References Cited

U.S. PATENT DOCUMENTS

| | | | | |
|---|---|---|---|---|
| 2016/0330799 | A1* | 11/2016 | Leyh | H01F 5/00 |
| 2019/0254125 | A1* | 8/2019 | Milanesi | H05B 6/065 |

FOREIGN PATENT DOCUMENTS

| | | | | | |
|---|---|---|---|---|---|
| EP | 706304 | A1 | * | 4/1996 | H05B 6/065 |
| EP | 2094060 | A2 | * | 8/2009 | H05B 6/1272 |
| EP | 2398297 | A1 | * | 12/2011 | H05B 6/1272 |
| EP | 2424329 | A2 | * | 2/2012 | H05B 6/1245 |
| FR | 2758934 | A1 | * | 7/1998 | H05B 6/065 |
| JP | H02-198518 | A | | 8/1990 | |
| JP | H5-253058 | A | | 10/1993 | |
| JP | H10-085123 | A | | 4/1998 | |
| JP | H10-113278 | A | | 5/1998 | |
| JP | H10-286170 | A | | 10/1998 | |
| JP | H10-321360 | A | | 12/1998 | |
| JP | 2002-065454 | A | | 3/2002 | |
| JP | 2010-146882 | A | | 7/2010 | |
| JP | 2010244925 | A | * | 10/2010 | H05B 6/1272 |
| JP | 2013-149470 | A | | 8/2013 | |
| KR | 2007114489 | A | * | 12/2007 | H05B 6/04 |
| WO | WO-2009113235 | A1 | * | 9/2009 | G07D 11/14 |
| WO | WO-2010084096 | A2 | * | 7/2010 | H05B 6/065 |
| WO | WO-2014167814 | A1 | * | 10/2014 | H05B 6/065 |
| WO | WO-2016181649 | A1 | * | 11/2016 | H05B 6/062 |

OTHER PUBLICATIONS

Chinese Office Action dated Jan. 12, 2021, issued in corresponding CN Patent Application No. 201780097373.7 (and English Machine Translation).

Japanese Office Action dated Mar. 2, 2021, issued in corresponding JP Patent Application No. 2019-557936 (and English Machine Translation).

Office Action dated Jun. 18, 2021 issued in corresponding CN patent application No. 201780097373.7 (and English translation).

International Search Report of the International Searching Authority dated Mar. 13, 2018 for the corresponding international application No. PCT/JP2017/043931 (and English translation).

* cited by examiner (a)

(b)

(a)            (b)            (c)

INDUCTION HEATING COOKER

CROSS REFERENCE TO RELATED APPLICATION

This application is a U.S. national stage application of PCT/JP2017/043931 filed on Dec. 7, 2017, the contents of which are incorporated herein by reference.

TECHNICAL FIELD

The present disclosure relates to an induction heating cooker including a housing in which an inner pot can be set and from which the inner pot can be removed, heating coils configured to heat the inner pot by induction, and an inverter circuit board configured to supply high frequency currents to the heating coils.

BACKGROUND ART

Up to now, for example, as described in Patent Literature 1, induction heating cookers have been proposed in which a first heating coil and a second heating coil are independently energized to enhance convections, and food taste and uneven heating are improved to enhance cooking performance. Each of these induction heating cookers has a barrel-shaped housing with its upper part being open. A barrel-shaped inner pot and an inner pot storage part are disposed inside the housing. Heating coils are provided outside the inner pot storage part. For example, as described in Patent Literature 2, some inner pots have such a shape that a bottom plate is oval, a sidewall is raised upward from the bottom plate, and an outer flange is formed at an upper end of the sidewall.

CITATION LIST

Patent Literature

Patent Literature 1: Japanese Unexamined Patent Application Publication No. 10-113278
Patent Literature 2: Japanese Unexamined Patent Application Publication No. 2002-065454

SUMMARY OF INVENTION

Technical Problem

As described above, according to the related-art configurations, heating coils are arranged in a concentric fashion, and an inner coil and an outer coil are alternately energized. Since the inner coil and the outer coil have different outer diameters, the inner coil and the outer coil can heat different areas of the inner pot. In this case, since the outer coil has a larger outer diameter than the outer diameter of the inner coil, the outer coil can heat a larger area of the inner pot. That is, when the inner coil and the outer coil have the same input power, the outer coil has smaller heating power per unit area than that of the inner coil. Therefore, a speed of the convection generated when the outer coil is energized and the inner coil is de-energized is lower than a speed of the convection when the outer coil is de-energized and the inner coil is energized, and uniform convections are not obtained. Furthermore, a problem occurs in the concentric coils that convections in an object to be heated that are generated in flow paths from a central part of the inner pot to side parts of the inner pot are dominant, and a convection in the object to be heated taking a flow path in the inner pot from one side part of the inner pot to the other side part of the inner pot is hardly generated.

The present disclosure has been made to solve the above-described problem, and provides an induction heating cooker configured to generate a convection taking a flow path in an inner pot from one side part of the inner pot to the other side part of the inner pot for the object to be heated in the inner pot.

Solution to Problem

An induction heating cooker according to an embodiment of the present disclosure includes a housing, an inner pot including a bottom part that includes a first area and a second area, an inner pot storage part disposed in the housing and configured to store the inner pot in a manner that the inner pot can be set or removed, a first heating coil disposed below the inner pot storage part, arranged in a position facing the first area of the inner pot, and configured to heat the inner pot by induction, a second heating coil disposed below the inner pot storage part, arranged in a position facing the second area of the inner pot, and configured to heat the inner pot by induction, a driving unit disposed in the housing and configured to supply high frequency currents to the first heating coil and the second heating coil, and a controller configured to control the driving unit.

Advantageous Effects of Invention

With the induction heating cooker according to the embodiment of the present disclosure, in the inner pot including the bottom part that includes the first area and the second area, the heating coils are respectively arranged in positions facing the first area and the second area, and the high frequency currents are independently supplied to the respective heating coils. Thus, the convection taking the flow path from one inner pot side part to the other inner pot side part of the inner pot can be generated for the object to be heated of the inner pot.

DESCRIPTION OF EMBODIMENTS

Embodiment 1

An induction heating cooker according to Embodiment 1 of the present disclosure will be described with reference to FIG. 1 to FIGS. 9(a) to 9(c).

Figure 1:
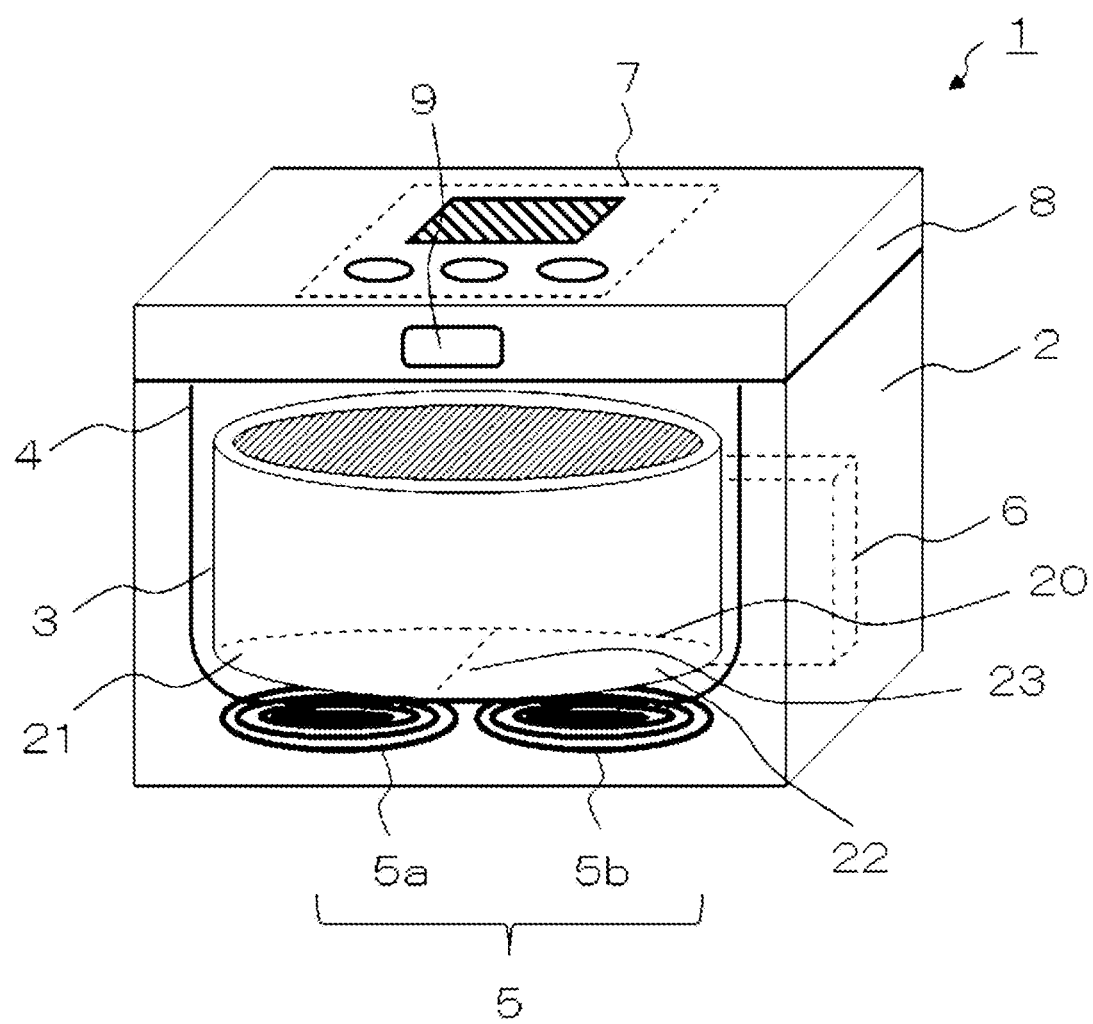
FIG. 1 is a configuration diagram of an induction heating cooker representing Embodiment 1 of the present disclosure.

FIG. 1 is a configuration diagram of the induction heating cooker representing Embodiment 1 of the present disclosure. In FIG. 1, an induction heating cooker 1 includes a housing 2, an inner pot 3, an inner pot storage part 4, a heating unit 5, an inverter circuit board 6, a controller 7, a lid body 8, and an opening and closing button 9. In addition, the heating unit 5 is arranged below the inner pot storage part 4, and includes a first heating coil 5a and a second heating coil 5b. The induction heating cooker 1 can also be used as a rice cooker when white rice and water are put in the inner pot 3, for example.

An outer shape of the housing 2 is cubic, for example. The inner pot 3 is stored in the inner pot storage part 4 disposed in the housing 2. The inner pot 3 has a bottomed barrel shape with its upper part being open. A bottom part 20 of the inner pot 3 is formed into an athletics track shape (oblong shape), for example. The inner pot 3 can be set in or removed from the inner pot storage part 4 of the housing 2. It is to be noted that the athletics track shape is constructed of a rectangle part coupled with semicircle parts at a pair of opposite sides. The bottom part 20 of the inner pot 3 includes a first area 21 and a second area 22. For example, the first area 21 and the second area 22 may have symmetrical shapes or asymmetrical shapes to an axis line 23 that passes through a center of the bottom part 20.

In addition, the inner pot 3 is an object to be heated, and is made of a base material composed of aluminum having a high heat conductivity or other materials. An outer surface of the inner pot 3 has a ferromagnetic material applied by coating, joining, or other methods. The inner pot 3 is heated by electromagnetic induction based on energization of a high frequency current to the heating unit 5. The inner pot storage part 4 is formed inside the housing 2, and stores the inner pot 3 in a manner that the inner pot 3 can be set or removed.

The first heating coil 5a and the second heating coil 5b are, for example, circular heating coils. To heat the inner pot 3 stored in the inner pot storage part 4 by induction, the first heating coil 5a and the second heating coil 5b are disposed in positions respectively facing the first area 21 and the second area 22 in the bottom part 20 of the inner pot 3, and the heating unit 5 is arranged in a line on the same plane in a longitudinal direction of the bottom part 20. Then, the inverter circuit board 6 is configured to supply high frequency currents to the heating unit 5. The inverter circuit board 6 converts power supplied from a commercial power supply into high frequencies to be supplied to the first heating coil 5a and the second heating coil 5b as the high frequency currents. It is to be noted that the inverter circuit board 6 represents a specific configuration of a driving unit configured to electrically drive the heating unit 5.

The controller 7 is arranged inside the lid body 8, for example, and furthermore, includes a display and operation unit on an upper part surface of the lid body 8 that is configured to accept a cooking instruction, a change to cooking contents, and other information from a user. Then, the controller 7 is configured to control the inverter circuit board 6 based on the instructed control contents. For example, the controller 7 includes a microcomputer, a random access memory (RAM), a read only memory (ROM), a timer (timing unit), and other components. The controller 7 performs arithmetic operations based on input signals and stored programs to control the inverter circuit board 6, and adjusts outputs of the first heating coil 5a and the second heating coil 5b. The lid body 8 is attached to a top part of the housing 2. The lid body 8 includes a hinge part (not shown), and the user can open and close the lid body 8. The lid body 8 is closed at the time of cooking. The user performs opening and closing operations of the lid body 8 when the inner pot 3 is set or removed or when ingredients are put in. The lid body 8 may include the opening and closing button 9, for example.

It is to be noted that the heating unit 5 is connected to the inverter circuit board 6, and the inverter circuit board 6 is connected to the controller 7 by a cable or other methods (not shown). In addition, a configuration may be adopted where the inner pot storage part 4 includes a temperature sensor (not shown) configured to measure a temperature of the inner pot 3, and the controller 7 controls the inverter circuit board 6 based on the temperature of the inner pot 3.

Next, an operation of the induction heating cooker according to Embodiment 1 will be described.

Figure 2:
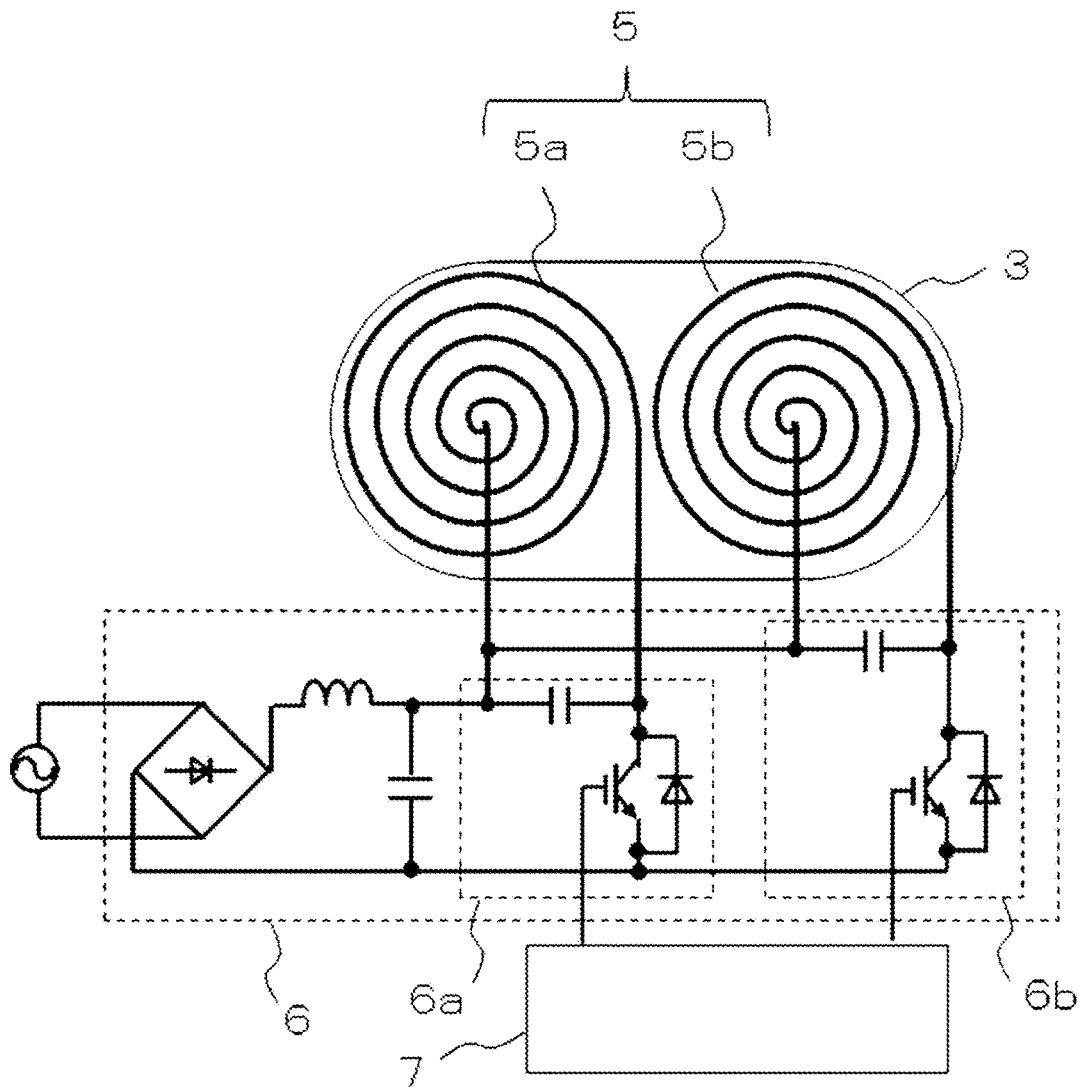
FIG. 2 is a circuit block diagram of the induction heating cooker representing Embodiment 1 of the present disclosure.

FIG. 2 is a circuit block diagram of the induction heating cooker representing Embodiment 1 of the present disclosure. In FIG. 2, when the user issues an instruction for heating to start such as a cooking instruction to the controller 7 that includes the display and operation unit, the controller 7 starts control of the inverter circuit board 6. The inverter circuit board 6 starts an operation in response to a signal from the controller 7, and supplies high frequency currents to the first heating coil 5a or the second heating coil 5b. When the high frequency current flows through the heating unit 5, an alternating magnetic field is generated from the heating unit 5, and accordingly the inner pot 3 serving as an object to be heated is provided with magnetic flux. Accordingly, an eddy current is generated in the inner pot 3, and Joule heating is generated based on this eddy current and an electrical resistance of the inner pot 3, so that the inner pot 3 is heated. It is to be noted that FIG. 2 illustrates only a planar outer shape of the inner pot 3.

According to the present embodiment, the inverter circuit board 6 is of a single-ended voltage resonance type inverter system, and includes two inverters including a first inverter 6a configured to supply a high frequency current to the first heating coil 5a and a second inverter 6b configured to supply a high frequency current to the second heating coil 5b. A single-ended voltage resonance inverter is of a known circuit configuration. It is to be noted that a half-bridge inverter and a full-bridge inverter are known for a circuit of an inverter configured to supply a high frequency current to the heating unit 5, and these circuits can also be used.

Next, an operation of the induction heating cooker 1 when heating for promoting convection (hereinafter, referred to as convection heating) is performed for ingredients put in the inner pot 3 will be described. Cases for the operation of the convection heating include a case where the operation is started by an instruction issued from the user for the controller 7 to perform the convection heating for the ingredients put in the inner pot 3, and a case where the convection heating is performed following a sequence of a cooking menu previously programmed in the controller 7.

Figure 3:
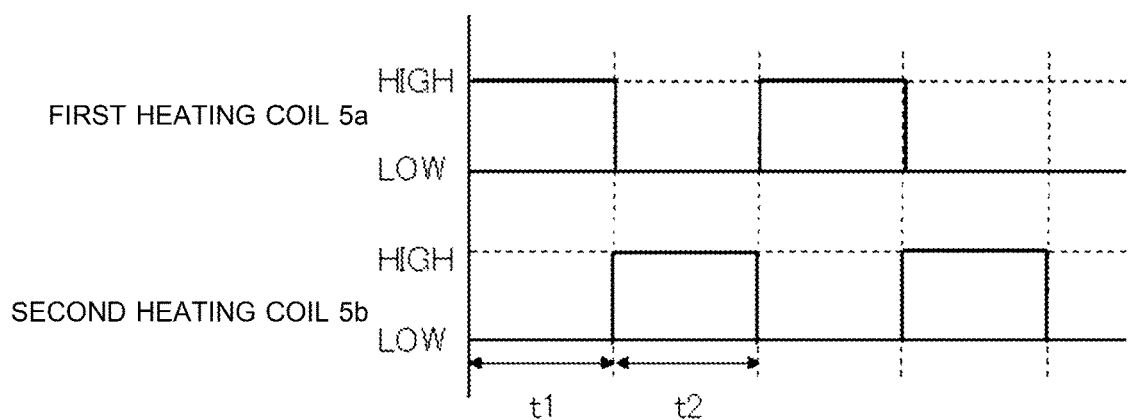
FIG. 3 is a drawing illustrating energizing waveforms of heating coils in a convection heating state of the induction heating cooker according to Embodiment 1 of the present disclosure.

FIG. 3 is a drawing illustrating energizing waveforms of heating coils in a convection heating state of the induction heating cooker according to Embodiment 1 of the present disclosure.

In FIG. 3, a state where a high frequency alternating current is applied to the heating unit 5 and the high frequency current flows is represented by HIGH, and a state where the high frequency current does not flow is represented by LOW for simplicity. The controller 7 supplies the high frequency current to the first heating coil 5a in a first period t1, and supplies the high frequency current to the second heating coil 5b in a second period t2. In this manner, when the first inverter circuit 6a and the second inverter circuit 6b are controlled to energize only any one of the first heating coil 5a and the second heating coil 5b, so that the generation of the convection is promoted. That is, the controller 7 controls the first inverter 6a and the second inverter 6b in a manner that the first period t1 and the second period t2 are continuously and alternately repeated.

Figure 4:
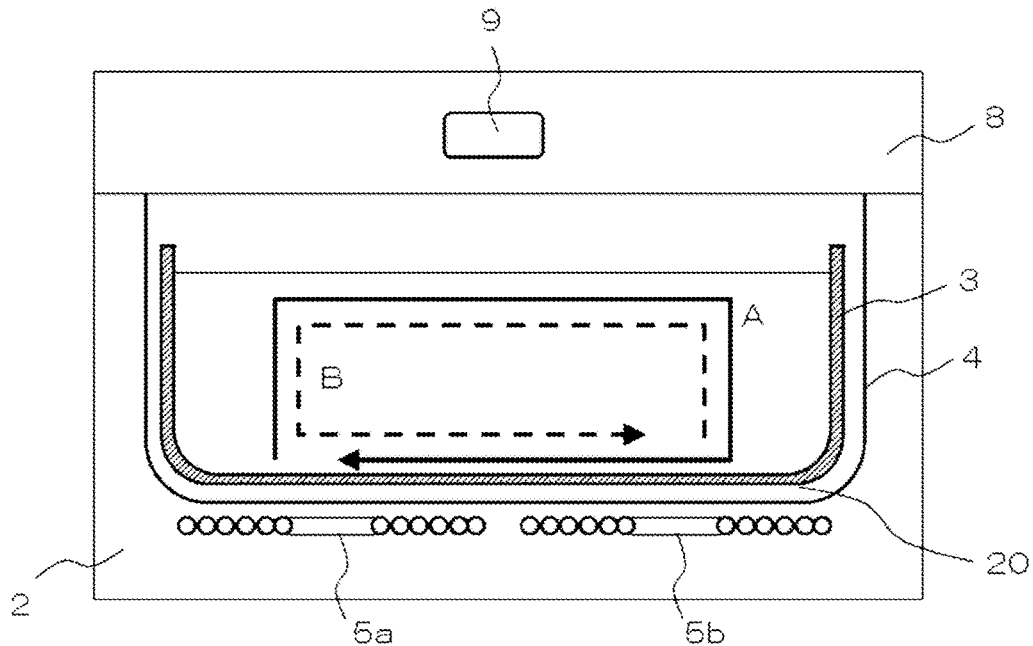
FIG. 4 is a cross sectional view illustrating an inner pot in the convection heating state of the induction heating cooker according to Embodiment 1 of the present disclosure.

FIG. 4 is a cross sectional view illustrating the inner pot in the convection heating state of the induction heating cooker according to Embodiment 1 of the present disclosure. Since the first heating coil 5a is energized in the first period t1 illustrated in FIG. 3, convection is generated in a flow path illustrated by a solid line of an arrow A in FIG. 4, and since the second heating coil 5b is energized in the second period t2, convection is generated in a flow path illustrated by a broken line of an arrow B.

Accordingly, since the bottom part 20 of the inner pot 3 has the athletics track shape, and the first heating coil 5a and the second heating coil 5b are arranged in a line in a longitudinal direction of the bottom of the inner pot 3, a long flow path is formed along the longitudinal direction of the inner pot 3, and large convection is generated. It is to be noted that in FIG. 3, a ratio of the first period t1 and the second period t1 for respectively energizing the first heating coil 5a and the second heating coil 5b is set as approximately 1:1, but the setting is not limited to this. For example, the ratio may be appropriately changed based on the cooking menu, convection states, the temperature of the inner pot 3, and other information, and an idle period in which both the first heating coil 5a and the second heating coil 5b are not energized may also be provided.

Next, an operation when the convection heating is performed in a state where input power is low, so-called on low heat, will be described.

Figure 5:
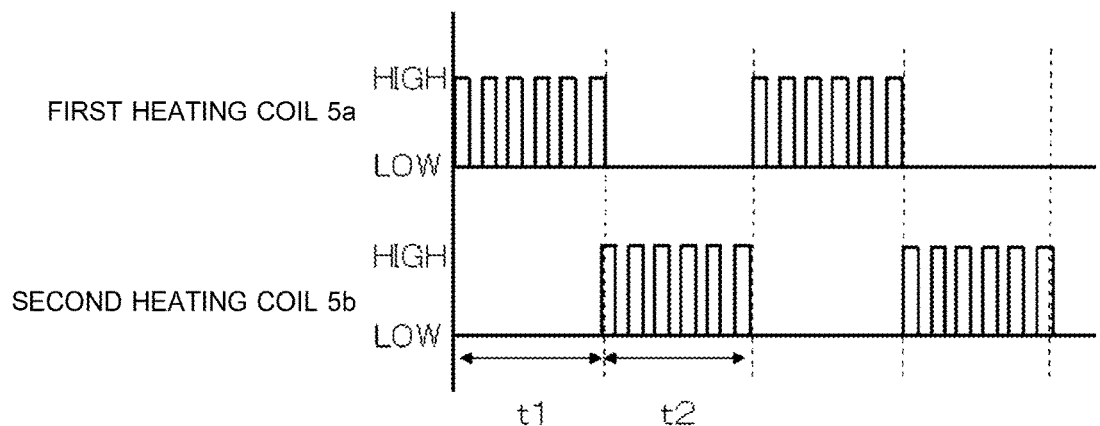
FIG. 5 is a drawing illustrating energizing waveforms of the heating coils in the convection heating state on low heat of the induction heating cooker according to Embodiment 1 of the present disclosure.

FIG. 5 is a drawing illustrating energized states of the first heating coil 5a and the second heating coil 5b when the convection heating is performed on low heat. As with in FIG. 3, the energized state of the heating coil 5 is represented by HIGH or LOW. In the first period t1, the first heating coil 5a is intermittently energized to reduce average input power to the inner pot 3. Next, in the second period t2, the second heating coil 5b is similarly intermittently energized. A cycle for intermittently performing the energization to each heating coil is set as a cycle with which the temperature of the inner pot 3 does not significantly fluctuate by the intermittent energization. Therefore, the above-described cycle is a cycle shorter than a switching cycle of the first heating coil 5a and the second heating coil 5b. Accordingly, by the intermittent energization, heating power of the first heating coil 5a and heating power of the second heating coil 5b are reduced on average to reduce heat to low. It is to be noted that for example, a setting time is set as approximately 5 seconds to 10 seconds for each of the first period t1 and the second period t2.

A reason why power is intermittently input to the first heating coil 5a and the second heating coil 5b to suppress the input power is because a single-ended voltage resonance type inverter used for the inverter circuit board 6 is of a circuit method where it is difficult to significantly reduce the input power to low power. According to this embodiment, the first heating coil 5a and the second heating coil 5b are alternately energized to promote the convection, and also each heating coil is intermittently energized at a shorter cycle than that the above-described cycle. Thus, the input power to the inner pot 3 can be finely controlled by adjusting the energization ratio, and the cooking performance can be improved. It is to be noted that in FIG. 5, the ratio of the first period t1 and the second period t2 is set as 1:1, but the setting is not limited to this. For example, the ratio may be appropriately changed based on the cooking menu, the convection state, the temperature of the inner pot 3, and other information, and the idle period in which both the first heating coil 5a and the second heating coil 5b are not energized may also be provided. In addition, the ratio may be increased or decreased in a range where the input power itself can be adjusted, and average power control based on the intermittent energization may be used in combination.

Next, an operation of the induction heating cooker 1 when the user instructs the controller 7 to heat the ingredients put in the inner pot 3 without the convection heating, that is, to heat the bottom part of the inner pot 3 evenly (hereinafter, referred to as even heating.) will be described.

Cases for the operation of the even heating include a case where the operation is started by an instruction issued from the user for the controller 7 to perform the even heating for the ingredients put in the inner pot 3 and a case where the even heating is performed following a sequence of the cooking menu previously programmed in the controller 7.

Figure 6:
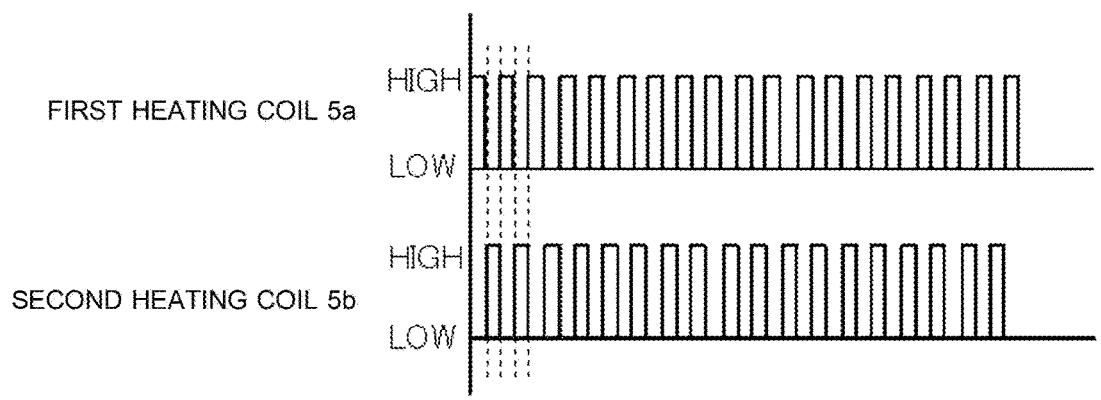
FIG. 6 is a drawing illustrating energizing waveforms of the heating coils in an even heating state of the induction heating cooker according to Embodiment 1 of the present disclosure.
Figure 7:
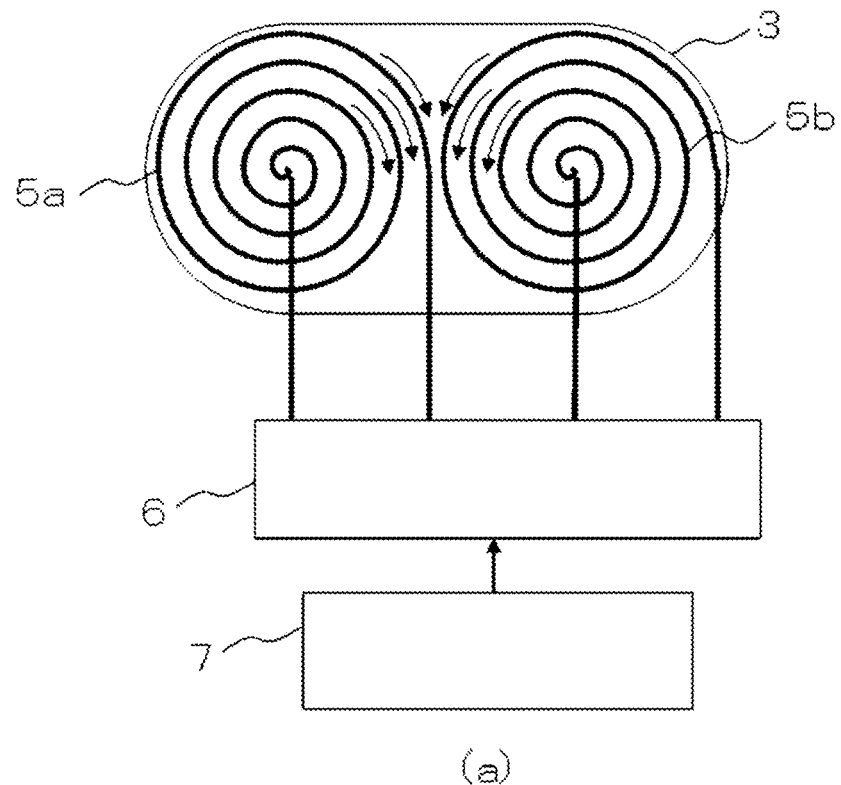
FIGS. 7(a) and 7(b) are drawings illustrating current directions when currents are caused to flow through two heating coils at the same time according to Embodiment 1 of the present disclosure.
Figure 7:
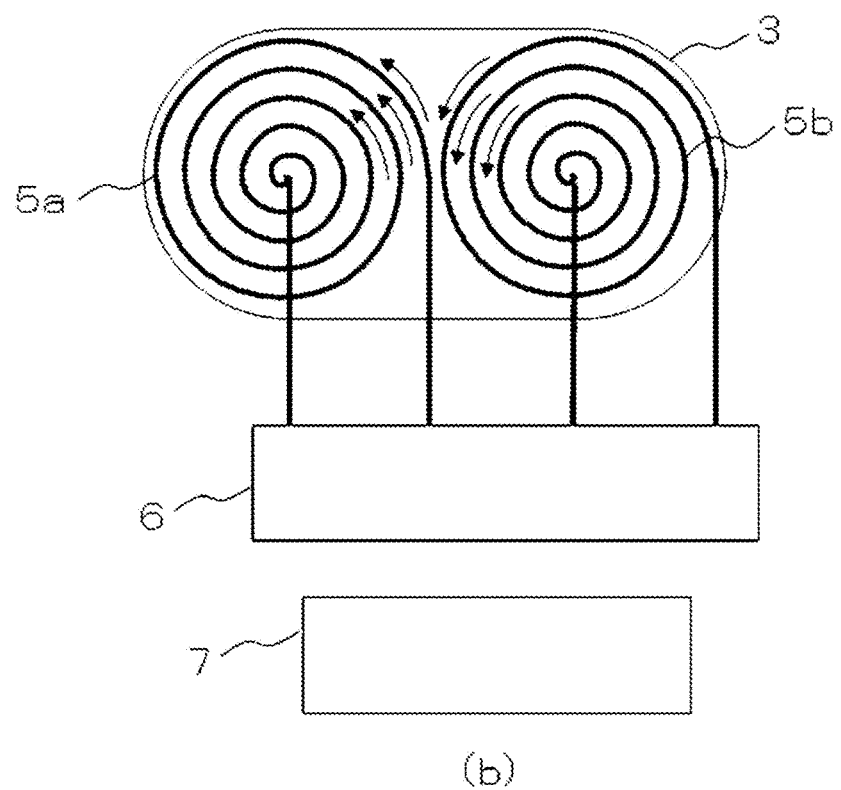

FIG. 6 is a drawing illustrating energizing waveforms of the heating coils in an even heating state of the induction heating cooker according to Embodiment 1 of the present disclosure. As with in FIG. 3, the energized state of the heating coil is represented by HIGH or LOW.

In FIG. 6, even when the even heating is performed, the controller 7 controls the inverter circuit board 6 to energize the first heating coil 5a and the second heating coil 5b alternately. At this time, the cycle for alternately energizing the first heating coil 5a and the second heating coil 5b is a shorter cycle than the cycle when the convection heating is performed. This is because when the energizing cycle is set as a short cycle relative to a speed of a temperature change at a bottom of the inner pot 3, temperatures at the bottom of the pot on a heating coil side in the energized state and on a heating coil side in a non-energized state are substantially equal to each other, and the temperatures at the bottom of the pot can be made uniform as much as possible. At this time, since the energizing cycle is short relative to the temperature change at the bottom part of the inner pot 3, the convection as in the time when the operation of the convection heating is performed is not generated. It is to be noted that as a specific time of the above-described short cycle, for example, a pulse cycle is set as approximately 3 seconds to 5 seconds, and a pulse width is set as a half of the pulse cycle or shorter.

In this manner, even when the even heating is performed, a reason why the inverter circuit board 6 is driven to energize the first heating coil 5a and the second heating coil 5b alternately is because heating efficiency is improved in addition to suppression of interfering sound by the induction heating. For example, if the first heating coil 5a and the second heating coil 5b were energized at the same time, driving frequencies of those are not the same. That is, a driving frequency of the single-ended voltage resonance type inverter used for the inverter circuit board 6 is decided based on an inductance of the heating unit 5 and an electrostatic capacitance of a resonant capacitor. However, since the inductance of the heating coil and the electrostatic capacitance of the resonant capacitor have individual variations, even when the first inverter 6a and the second inverter 6b output the same power, the driving frequencies are not the same.

In general, in a case where the induction heating is performed using a plurality of heating coils at the same time in a state where a plurality of heating coils are close to each other, it is known that when a difference of mutual driving frequencies is a frequency in an auditory range, this causes interfering sound, and noise is generated. For example, when one inverter is driven at 30 kHz and the other inverter is driven at 35 kHz, the interfering sound at 5 kHz is generated. Similarly, when the first inverter 6a and the second inverter 6b are driven at different driving frequencies at the same time, the interfering sound derived from the difference of the driving frequencies of those is generated, and becomes a cause of noise.

In addition, when the first heating coil 5a and the second heating coil 5b are energized at the same time, the heating efficiency may decrease due to mutual phases of the high frequency currents flowing through the heating coils in some cases.

FIGS. 7(a) and 7(b) are drawings illustrating current directions when currents are caused to flow through two heating coils at the same time according to Embodiment 1 of the present disclosure. When a current flows in a direction represented by an arrow illustrated in FIG. 7(a), in the vicinity of an area where the first heating coil 5a and the second heating coil 5b are adjacent to each other, the directions of the flowing mutual currents are the same, and no problem occurs since magnetic fluxes generated in the mutual heating coils are added to each other. When a current flows in a direction represented by an arrow illustrated in FIG. 7(b), in the vicinity of the area where the first heating coil 5a and the second heating coil 5b are adjacent to each other, the directions of the flowing mutual currents are in opposite directions, and the magnetic fluxes are cancelled out. Therefore, effective heating is not performed, and the heating efficiency is substantially decreased. When the interfering sound and the efficiency reduction are suppressed while the first heating coil 5a and the second heating coil 5b are energized at the same time, frequencies and phases of the currents flowing through the heating coils are to be accurately matched, and sophisticated control technology or inverter circuit technology is to be used. Thus, this may cause high costs and size increase of the device in some cases.

Therefore, according to the present embodiment, even at the time of the heating when the convection heating is not actively performed, the first heating coil 5a and the second heating coil 5b are alternately energized to avoid a situation where the first heating coil 5a and the second heating coil 5b are energized at the same time. Accordingly, it is possible to suppress the generation of the interfering sound and the decrease in the heating efficiency without using a complicated inverter circuit or complicated control. Thus, it is possible to provide the compact and inexpensive induction heating cooker.

Figure 8:
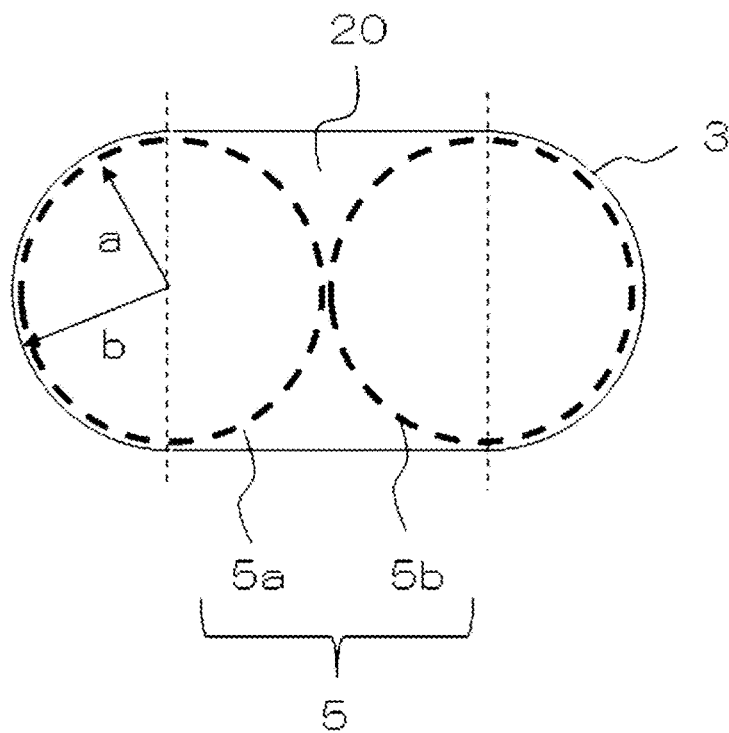
FIG. 8 is a plan view illustrating outer shapes and a positional relationship of the inner pot and the heating coils of the induction heating cooker according to Embodiment 1 of the present disclosure.
Figure 9:
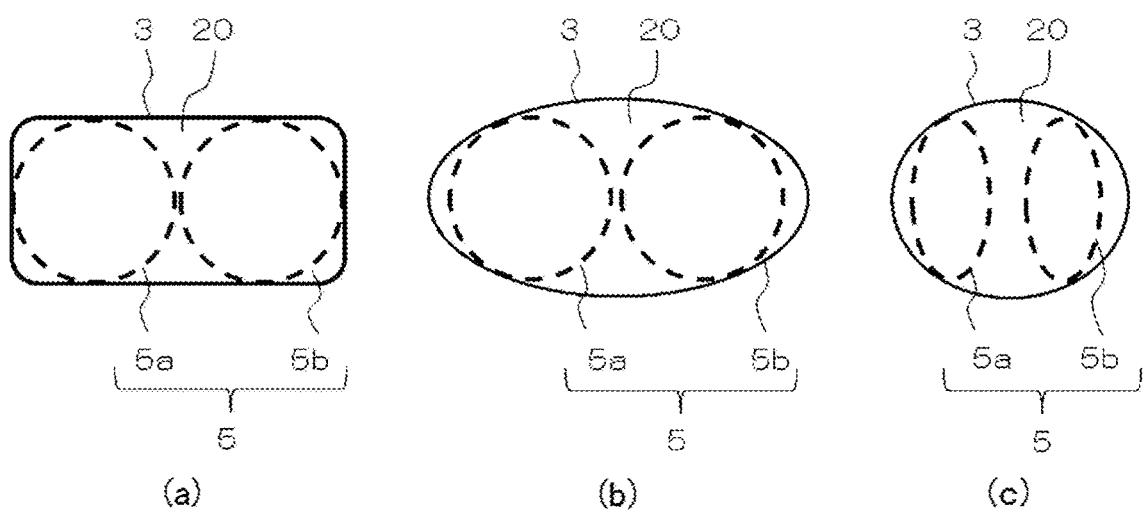
FIGS. 9(a) to 9(c) are plan views illustrating modified examples of the outer shapes and the positional relationship of the inner pot and the heating coils of the induction heating cooker according to Embodiment 1 of the present disclosure.

FIG. 8 is a plan view illustrating outer shapes and a positional relationship of the inner pot and the heating coils of the induction heating cooker according to Embodiment 1 of the present disclosure.

In FIG. 8, the bottom part 20 of the inner pot 3 is formed into the athletics track shape, and two pots can be arranged by substantially matching a radius a of the heating unit 5 with a radius b of a semicircular part of the inner pot 3. For example, as compared with a case where two pieces of the perfectly circular heating units 5 are aligned while the perfectly circular inner pot 3 is used, the installation area of the heating units 5 can be increased relative to the area of the bottom part 20 of the inner pot 3. Therefore, it is possible to reduce the part where the induction heating is not performed in the bottom part 20. Furthermore, since the athletics track shape is used, as compared with a perfectly circular inner pot, the convection flow path is lengthened along the longitudinal direction, and it is possible to generate large convection. In addition, an advantage is also attained that elongated food such as fish can be cooked while its shape is kept as it is.

It is to be noted that the shape of the bottom part 20 of the inner pot 3 is not limited to the athletics track shape illustrated in FIG. 8, and other shapes described below may also be used.

FIGS. 9(a) to 9(c) are plan views illustrating modified examples of the outer shapes and the positional relationship of the inner pot and the heating coils of the induction heating cooker according to Embodiment 1 of the present disclosure.

FIGS. 9(a) to 9(c) show the plan views of the inner pot 3 and the heating unit 5, and with regard to the shape of the inner pot 3, FIG. 9(a) illustrates a rectangular configuration, FIG. 9(b) illustrates an oval configuration, and FIG. 9(c) illustrates a circular configuration. Any configuration including the first heating coil 5a and the first heating coil 5b in the bottom part 20 of the inner pot 3 may be used. It is to be noted that as with in FIG. 8, FIGS. 9(a) to 9(c) are the plan views simplifying and illustrating only the outer shapes of the inner pot 3, the first heating coil 5a, and the second heating coil 5b, and detailed structures are omitted.

Embodiment 2

An induction heating cooker of Embodiment 2 of the present disclosure will be described with reference to FIG. 10 to FIG. 12.

To describe differences from the above-described Embodiment 1 mainly, the same or equivalent parts to those of Embodiment 1 are assigned with the same reference signs, and descriptions will be simplified or omitted.

Figure 10:
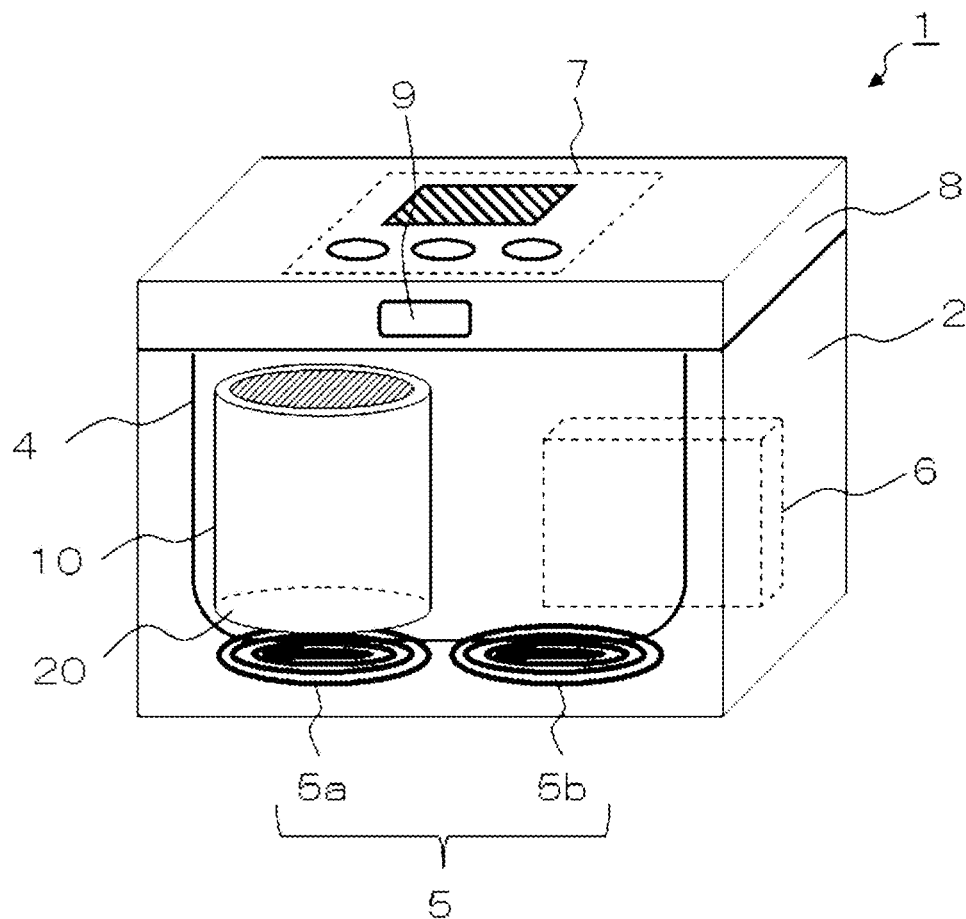
FIG. 10 is a configuration diagram of an induction heating cooker representing Embodiment 2 of the present disclosure.

FIG. 10 is a configuration diagram of the induction heating cooker representing Embodiment 2 of the present disclosure.

Embodiment 1 illustrates the mode where the inner pot 3 is configured to have the bottomed barrel shape with its upper part being open, the planar shape of the bottom part 20 is formed into the oblong shape, and the inner pot 3 can be set in or removed from the inner pot storage part 4 of the housing 2. In FIG. 10, in addition to the configuration of Embodiment 1, the induction heating cooker 1 includes a barrel-shaped compact inner pot 10 arranged on any one of top surfaces of the first heating coil 5*a* and the second heating coil 5*b* and disposed in a manner that the compact inner pot 10 can be set or removed from the inner pot storage part 4 of the housing 2. The user selects the inner pot 3 or the compact inner pot 10 based on cooking contents, and stores any one of the inner pots in the inner pot storage part 4. It is to be noted that a size of a bottom part of the compact inner pot 10 is shorter than the bottom part of the inner pot 3 in the longitudinal direction.

Next, an operation of the induction heating cooker 1 when the user stores the compact inner pot 10 in the inner pot storage part 4 will be described.

Figure 11:
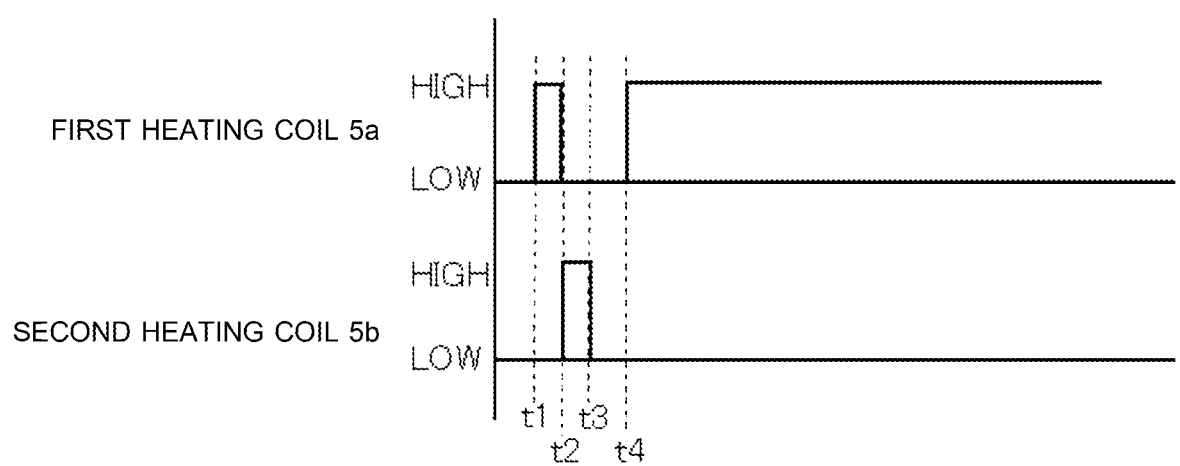
FIG. 11 is a drawing illustrating energizing waveforms of the heating coils of the induction heating cooker according to Embodiment 2 of the present disclosure.

FIG. 11 is a drawing illustrating energizing waveforms of the heating coils of the induction heating cooker according to Embodiment 2 of the present disclosure.

In FIG. 11, when the user issues the instruction for starting the heating such as the cooking instruction to the controller 7 that includes the display and operation unit, the controller 7 starts driving and control of the inverter circuit board 6. The inverter circuit board 6 starts an operation in response to a signal from the controller 7. At a time t1 in FIG. 11, the inverter circuit board 6 supplies a high frequency current to the first heating coil 5*a* for a short period of time, and supplies a high frequency current to the second heating coil 5*b* for a short period of time at a time t2. Herein, the compact inner pot 10 is disposed on the top surface of the first heating coil 5*a*. An object to be heated does not exist on the second heating coil 5*b* in an unloaded condition. Therefore, the controller 7 discriminates load conditions of the first heating coil 5*a* and the second heating coil 5*b* from the high frequency currents to be supplied, voltages generated from the currents, and other information, and discriminates the presence or absence of the compact inner pot 10 and a type of the inner pot. That is, when it is detected that pots are present on both the first heating coil 5*a* and the second heating coil 5*b*, it is determined that the inner pot 3 is stored, and when it is detected that the inner pot is present on any one of the first heating coil 5*a* and the second heating coil 5*b*, it is determined that the compact inner pot 10 is stored. In the case of the induction heating cooker 1 illustrated in FIG. 10, it is determined that the second heating coil 5*b* is in the unloaded condition when the compact inner pot 10 is stored on the top surface of the first heating coil 5*a*.

Next, at a time t4, the controller 7 performs the control to supply the high frequency current to only the first heating coil 5*a* where the compact inner pot 10 exists, and the second heating coil 5*b* is not energized. Accordingly, the compact inner pot 10 is heated by induction to start cooking the ingredients contained in the compact inner pot 10.

In this manner, according to this embodiment, the user can choose the inner pot 3 having the oblong shape and a large storage volume for the ingredients or the compact inner pot 10 having a small storage volume for the ingredients depending on the amount of ingredients. When a small amount of the ingredients is used, by choosing the compact inner pot 10 having the small storage volume, the induction heating cooker 1 drives only the heating unit 5 on the side where the compact inner pot 10 is stored. Therefore, the heating can be efficiently performed while wasteful power is reduced, and the cooking time can also be shortened. It is to be noted that the compact inner pot 10 does not necessarily need to be strictly arranged on any one of top surfaces of the first heating coil 5*a* or the second heating coil 5*b*. A part of the compact inner pot 10 arranged on the top surface of the first heating coil 5*a* may touch a part of the top surface of the second heating coil 5*b* without problems. That is, the heating coil corresponding to the larger area of the top part of the heating coil 5 covered by the compact inner pot 10 among the top parts of the first heating coil 5*a* and the second heating coil 5*b* may be energized. The current flowing through the inverter that drives the heating coil varies depending on the area of the magnetic body cooking container that covers the top part of the heating coil, for example. Therefore, the discrimination of the heating coil having the larger area covered by the compact inner pot 10 among the top parts of the first heating coil 5*a* and the second heating coil 5*b* can be performed based on current values flowing through the first inverter 6*a* and the second inverter 6*b* respectively driving the first heating coil 5*a* and the second heating coil 5*b*.

Next, a configuration for arranging a temperature sensor in a central part of each of the first heating coil 5*a* and the second heating coil 5*b* will be described.

Figure 12:
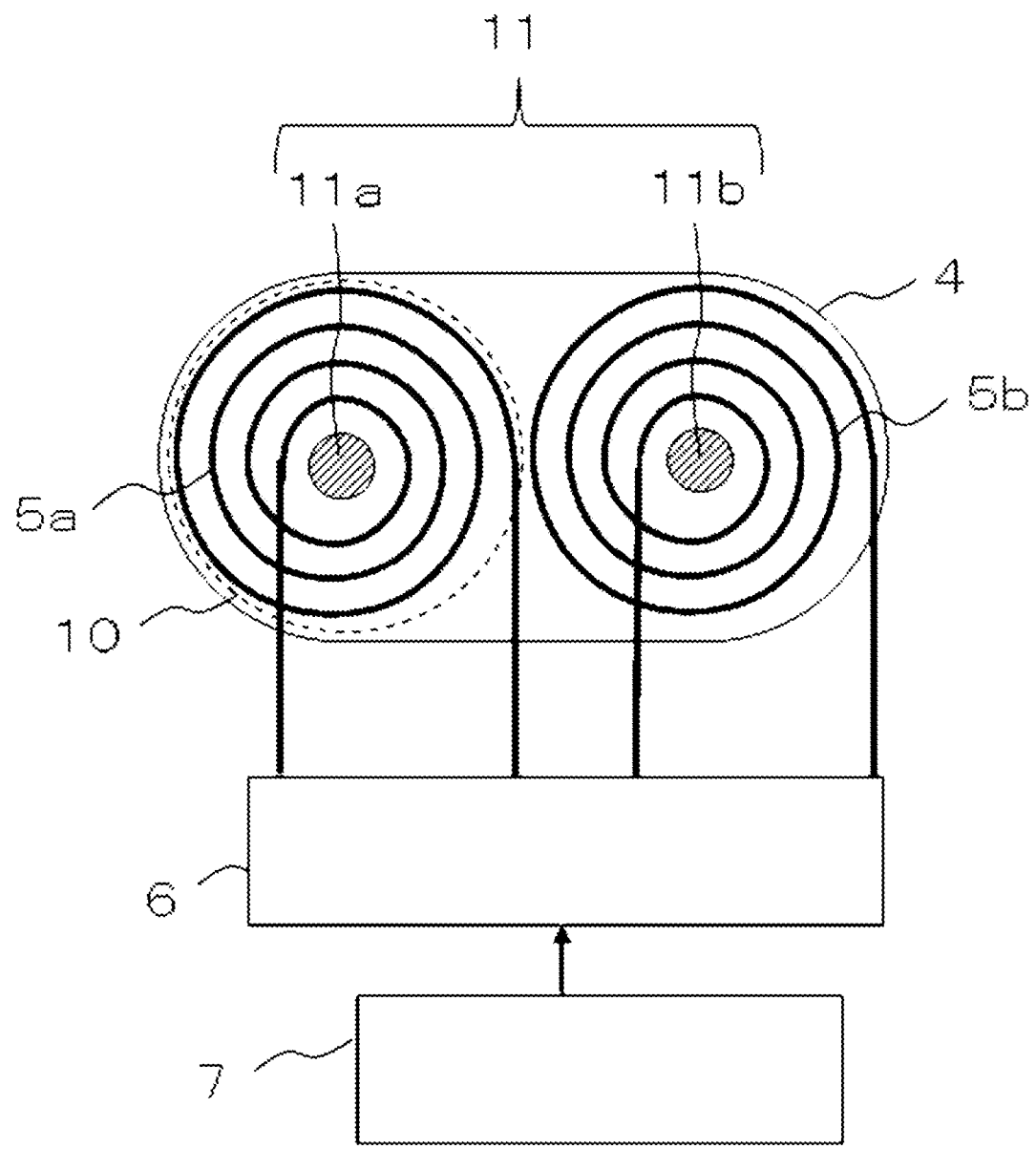
FIG. 12 is a plan view illustrating the installation of a temperature sensor of the induction heating cooker according to Embodiment 2 of the present disclosure.

FIG. 12 is a plan view illustrating the installation of a temperature sensor of the induction heating cooker according to Embodiment 2 of the disclosure.

In FIG. 12, since the compact inner pot 10 can be disposed on any one of the upper part of the first heating coil 5*a* and the upper part of the second heating coil 5*b*, a temperature sensor 11 may be provided. For the temperature sensor 11, for example, a first temperature sensor 11*a* and a second temperature sensor 11*b* are respectively provided in the central part of the first heating coil 5*a* and the central part of the second heating coil 5*b*. The temperature sensor 11 is constituted by, for example, a thermistor. The temperature sensor 11 penetrates through the inner pot storage part 4 and is pressed against the bottom part 20 of the compact inner pot 10 by using a spring or other parts, and is configured to directly measure a temperature of the bottom part 20 of the compact inner pot 10. Accordingly, the cooking is performed while the temperature of the compact inner pot 10 is monitored, and the temperature sensor 11 is used to control the input power and the cooking time depending on the cooking menu. Since the temperature sensor 11 is provided in each of the first heating coil 5*a* side and the second heating coil 5*b* side, the user can perform the cooking by disposing the compact inner pot 10 on either the upper part of the first heating coil 5*a* or the upper part of the second heating coil 5*b*.

Embodiment 3

An induction heating cooker according to Embodiment 3 of the present disclosure will be described with reference to FIG. 13 to FIG. 15.

To describe differences from the above-described Embodiment 1 mainly, the same or equivalent parts to those of Embodiment 1 are assigned with the same reference signs, and descriptions will be simplified or omitted.

Figure 13:
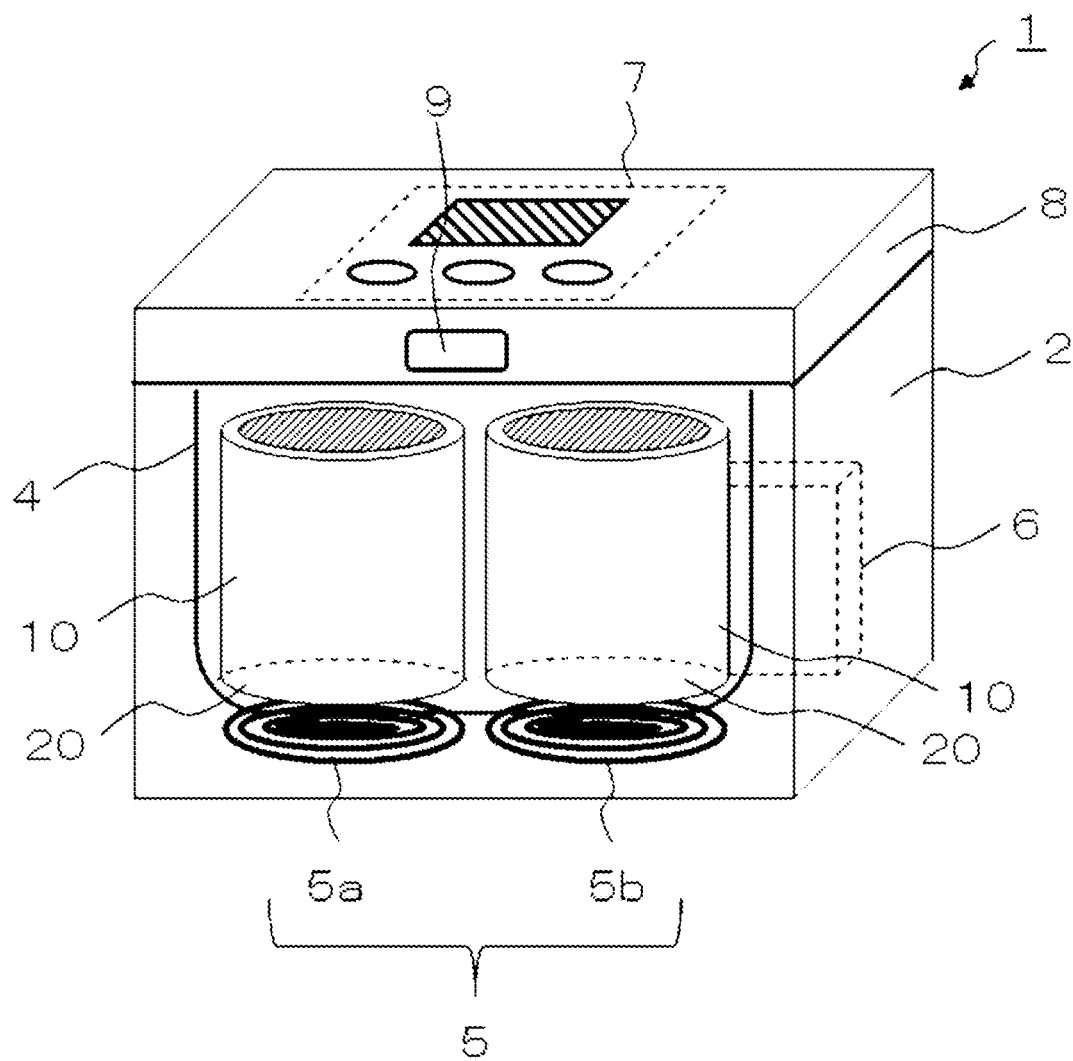
FIG. 13 is a configuration diagram of an induction heating cooker representing Embodiment 3 of the present disclosure.

FIG. 13 is a configuration diagram of an induction heating cooker representing Embodiment 3 of the present disclosure.

The mode has been illustrated where, in the induction heating cooker 1 illustrated in Embodiment 1, the inner pot 3 is configured to have the bottomed barrel shape with its upper part being open and formed to have the oblong shape as viewed from the top, and the inner pot 3 can be set in or removed from the inner pot storage part 4 of the housing 2. In FIG. 13, in addition to the configuration of Embodiment 1, the induction heating cooker 1 includes a plurality of the barrel-shaped compact inner pots 10 respectively arranged on the first heating coil 5a and the upper part of the second heating coil 5b in a manner that the plurality of barrel-shaped compact inner pots 10 can be set in or removed from the inner pot storage part 4 of the housing 2. The user chooses the inner pot 3 or the plurality of compact inner pots 10 to be stored in the inner pot storage part 4 depending on the cooking contents. In addition, since a plurality of the bottom parts 20 of the compact inner pots 10 are arranged in the inner pot storage part 4, the plurality of bottom parts 20 are set to have a length shorter than the length of the bottom part 20 of the inner pot 3 in the longitudinal direction.

Next, an operation of the induction heating cooker 1 when the user stores the plurality of compact inner pots 10 in the inner pot storage part 4 will be described.

Figure 14:
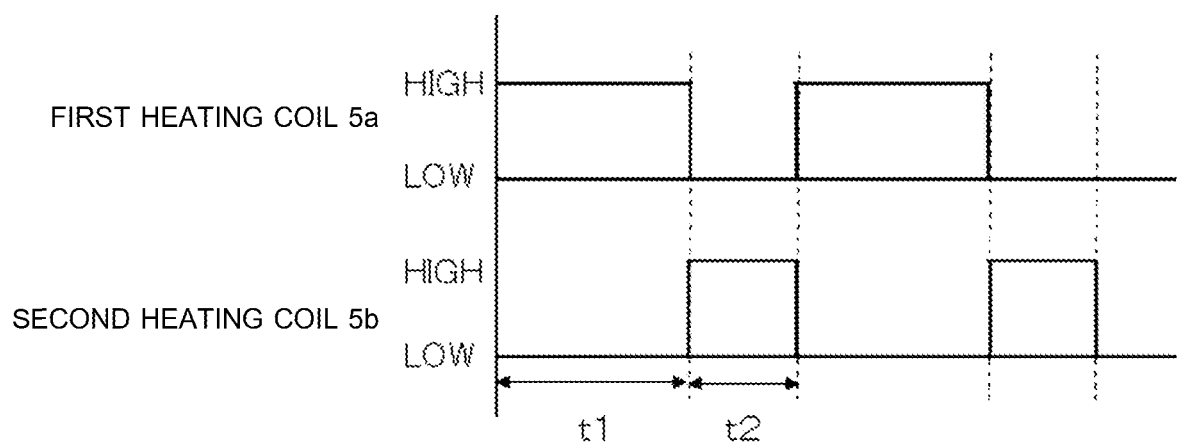
FIG. 14 is a waveform diagram illustrating energizing waveforms of the heating coils of the induction heating cooker according to Embodiment 3 of the present disclosure.

FIG. 14 is a waveform diagram illustrating energizing waveforms of the heating coils of the induction heating cooker according to Embodiment 3 of the present disclosure.

In FIG. 14, when the user issues the instruction for starting the heating such as the cooking instruction to the controller 7 that includes the display and operation unit, the controller 7 starts the control of the inverter circuit board 6. The inverter circuit board 6 operates in response to the signal from the controller 7, and alternately supplies the high frequency currents to the first heating coil 5a and the second heating coil 5b. For example, when the compact inner pot 10 arranged on the first heating coil 5a is heated on high heat, and the other compact inner pot 10 arranged on the second heating coil 5b is heated on low heat based on the instruction of the user or the previously programmed cooking sequence, as illustrated in FIG. 14, the first period t1 for energizing the first heating coil 5a is set to be longer than the second period t2 for energizing the second heating coil 5b, and the high frequency currents are alternately supplied to the first heating coil 5a and the second heating coil 5b. Accordingly, average input power to the compact inner pot 10 arranged on the upper part of the first heating coil 5a can be larger than average input power to a compact inner pot 12b arranged on the upper part of the second heating coil 5b.

It is to be noted that for example, the ratio of the first period t1 and the second period t2 may be appropriately changed depending on the cooking menu, the temperature of the inner pot, and other information, and the idle period in which both the first heating coil 5a and the second heating coil 5b are not energized may also be provided. In addition, the ratio may be adjusted in a range where the input power itself can be adjusted by the control of the inverter circuit board 6, and the average power control based on the intermittent energization may be used in combination.

In this manner, according to this embodiment, the user can choose the oblong inner pot 3 having the large storage volume for the ingredients and the plurality of compact inner pots 10 each having the small storage volume for the ingredients depending on the cooking contents. When the plurality of compact inner pots 10 each having the small storage volume are chosen, mutually different powers and cooking times can be set, and two different cooking processes can be performed at the same time by using the single cooker. Accordingly, the cooking time can be shortened. In addition, since the first heating coil 5a and the second heating coil 5b are not energized at the same time, it is possible to suppress the decrease in the heating efficiency due to the generation of the interfering sound and the currents flowing through the adjacent heating coils at the same time.

Next, a modified example of the inner pot configuration will be described.

Figure 15:
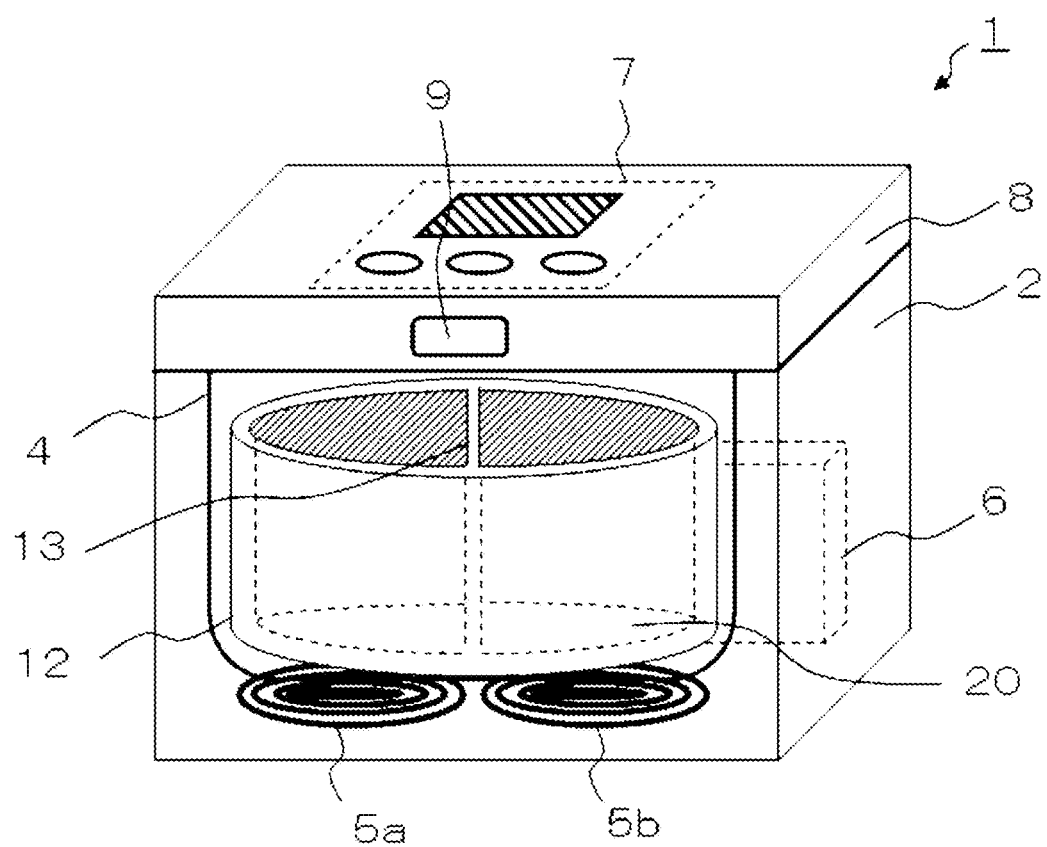
FIG. 15 is a configuration diagram illustrating a modified example of the induction heating cooker according to Embodiment 3 of the present disclosure.

FIG. 15 is a configuration diagram illustrating another modified example of the induction heating cooker according to Embodiment 3 of the present disclosure.

The configuration using the independent two compact inner pots has been described with reference to FIG. 13. For example, as illustrated in FIG. 15, a two-chambered inner pot 12 including a dividing wall 13 that divides the ingredients therein may also be used as one oblong inner pot. The dividing wall 13 divides a space for containing the ingredients into two in the longitudinal direction of this bottom part when the bottom part 20 of the two-chambered inner pot 12 has an oblong shape.

In addition, as with in FIG. 12, the temperature sensors 11 are desirably disposed on both sides of the central parts of the first heating coil 5a and the second heating coil 5b in the induction heating cooker 1 illustrated in FIG. 13 and FIG. 15. In the induction heating cooker 1 illustrated in FIG. 13, since both the temperatures of the plurality of compact inner pots 10 can be independently measured, appropriate power control can be performed depending on the pot temperatures, and usability at the time of the cooking is improved. In addition, in the induction heating cooker 1 illustrated in FIG. 14, since both the temperatures of the two-chambered inner pot 12 corresponding to the spaces for containing the ingredients can be measured, the appropriate power control can be performed depending on the pot temperatures, and the usability at the time of the cooking is improved.

In addition, it has been described that the driving unit according to the above-described Embodiments 1 to 3 has the configuration where the first inverter 6a and the second inverter 6b are respectively connected to the first heating coil 5a and the second heating coil 5b, the embodiments of the present disclosure are not limited to this configuration. For example, the driving unit may include a single inverter, and an output of this inverter may be input to any one of the first heating coil 5a and the second heating coil 5b by relaying to perform the driving.

The components according to the above-described respective embodiments and the connection modes, the control contents, and other settings for the components are examples, and are not intended to limit the present disclosure. In other words, within a range without departing from the gist of the present disclosure, the components and the connection modes, the control contents, and other settings for the components can be deployed to other devices, various modifications can be made to the components and the connection modes, the control contents, and other settings for the component, and those can be combined.

REFERENCE SIGNS LIST 1 induction heating cooker 2 housing 3 inner pot 4 inner pot storage part 5 heating unit 5a first heating coil 5b second heating coil 6 inverter circuit board 6a first inverter 6b second inverter 7 controller 8 lid body 9 opening and closing button 10 compact inner pot 11 temperature sensor 11a first temperature sensor 11b second temperature sensor 12 two-chambered inner pot 13 dividing wall 20 bottom part 21 first area 22 second area 23 axis line

The invention claimed is:

1. An induction heating cooker, comprising:
a housing;
an inner pot including a bottom part, the bottom part including a first area and a second area;
an inner pot storage part disposed in the housing and configured to store the inner pot in a manner that the inner pot can be set or removed;
a first heating coil disposed below the inner pot storage part, arranged in a position facing the first area of the inner pot, and configured to heat the inner pot by induction;
a second heating coil disposed below the inner pot storage part, arranged in a position facing the second area of the inner pot, and configured to heat the inner pot by induction;
wherein the bottom part of the inner pot is formed into an athletics track shape having a rectangle part coupled with semicircular parts at opposite sides, and each of the first heating coil and the second heating coil has a circular shape having a radius which matches a radius of the semicircular parts of the bottom part of the inner pot
a driving unit disposed in the housing and configured to supply high frequency currents to the first heating coil and the second heating coil; and
a controller configured to control the driving unit, so that the heating of the first area and the heating of the second area are continuously and alternately repeated, wherein
the first area is positioned on one side of the axis line that passes through a center of the bottom part, and the second area is positioned on an other side of the axis line.

2. The induction heating cooker of claim 1, wherein the first area and the second area have shapes symmetrical to the axis line.

3. The induction heating cooker of claim 1, wherein the driving unit includes
a first inverter configured to supply a high frequency current to the first heating coil, and
a second inverter configured to supply a high frequency current to the second heating coil.

4. The induction heating cooker of claim 1, wherein the controller controls the driving unit in a manner that the first heating coil is intermittently energized in a first period in which only the first heating coil is energized, and the second heating coil is intermittently energized in a second period in which only the second heating coil is energized.

5. The induction heating cooker of claim 1, further comprising:
a first temperature sensor configured to measure a temperature of the inner pot heated by the first heating coil; and
a second temperature sensor configured to measure a temperature of the inner pot heated by the second heating coil.

6. The induction heating cooker of claim 1, wherein an outer surface of the inner pot has a ferromagnetic material, and the inner pot is heated by electromagnetic induction.

7. The induction heating cooker of claim 1, further comprising
a lid body attached to the housing, configured to close the housing,
wherein the controller is arranged inside the lid body and further includes a display configured to accept an instruction from a user, and the controller controls the inverter circuit board.

* * * * *